United States Patent
Becherer

(10) Patent No.: US 9,502,017 B1
(45) Date of Patent: Nov. 22, 2016

(54) AUTOMATIC AUDIO REMIXING WITH REPETITION AVOIDANCE

(71) Applicant: Adobe Systems Incorporated, San Jose, CA (US)

(72) Inventor: Nico Alexander Becherer, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/099,439

(22) Filed: Apr. 14, 2016

(51) Int. Cl.
- *G04B 13/00* (2006.01)
- *G10H 1/00* (2006.01)
- *G06F 3/16* (2006.01)

(52) U.S. Cl.
CPC ............ *G10H 1/0025* (2013.01); *G06F 3/165* (2013.01); *G10H 2210/076* (2013.01); *G10H 2210/105* (2013.01); *G10H 2210/136* (2013.01); *G10H 2210/145* (2013.01)

(58) Field of Classification Search
CPC ...................... G10H 1/0058; G10H 2240/071; G10H 2240/016; G10H 1/18; G10H 2210/031; G10H 2210/051; G10H 2220/081
See application file for complete search history.

(56) References Cited

U.S. PATENT DOCUMENTS

| | | | | |
|---|---|---|---|---|
| 7,855,333 B2* | 12/2010 | Miyajima | ............ | G10H 1/0025 84/612 |
| 8,525,012 B1* | 9/2013 | Yang | ........................ | G10H 1/08 700/94 |
| 9,111,519 B1* | 8/2015 | Yang | ........................ | G10H 1/40 |
| 9,214,144 B1* | 12/2015 | Yang | ........................ | G10H 1/08 |
| 2002/0166440 A1* | 11/2002 | Herberger | ............ | G10H 1/0041 84/625 |
| 2004/0106395 A1* | 6/2004 | Suganuma | ........... | G10H 1/0058 455/412.2 |
| 2007/0255739 A1* | 11/2007 | Miyajima | ................ | G10H 1/40 |
| 2009/0044689 A1* | 2/2009 | Komori | ................ | G10H 1/0025 84/625 |
| 2009/0272253 A1* | 11/2009 | Yamashita | ........... | G10H 1/0025 84/611 |
| 2010/0170382 A1* | 7/2010 | Kobayashi | ........... | G10H 1/0025 84/613 |
| 2014/0366710 A1* | 12/2014 | Eronen | .................... | G10H 1/00 84/609 |
| 2015/0094835 A1* | 4/2015 | Eronen | .................... | G06F 3/165 700/94 |
| 2016/0005387 A1* | 1/2016 | Eronen | .................... | G10H 1/40 84/611 |

* cited by examiner

*Primary Examiner* — Marlon Fletcher
(74) *Attorney, Agent, or Firm* — Wolfe-SBMC

(57) ABSTRACT

A digital medium environment includes an audio editing application that remixes an original audio recording to play back over a target duration. An improved audio remixing method implemented by the audio editing application comprises segmenting the original audio recording into individual beats, computing costs for transitioning between different beats of the original audio recording, and creating a remixed audio recording using the transition costs and beats of the original audio recording. As the remixed audio recording is created, transition costs are updated by assigning penalties to transitions as the transitions are inserted into the remix. Using the beats of the original audio recording with updated transition costs ensures that a remix retains a quality and structure of the original audio recording while avoiding repetition. In some implementations, the audio editing application performs remixing to extend playback of an original audio recording to a longer duration while preserving a beat-level structure of the original audio recording.

20 Claims, 5 Drawing Sheets

AUTOMATIC AUDIO REMIXING WITH REPETITION AVOIDANCE

BACKGROUND

Users who deal with music content sometimes need to adapt the length of the music to a given duration which may be longer than the original duration. For example, users may need to adapt music to fit the length of a video segment or a played scene on stage. Current approaches tend to create multiple, repetitive loop segments when prolonging music content. If a song's duration is extended by a multiple of its original duration, these repetitions become highly noticeable to listeners which, in turn, can leave a perception that the audio recording was of a lower quality. In addition, there is no guarantee that the repetitions will present the song's original material in a manner that preserves the music creator's intent. That is, the new extended version of the song may sound markedly different than the original version. While it is possible to use a brute force approach to attempt to avoid repetitions, the runtime complexity is extremely high, thus making a brute force approach unfeasible in practice.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, in a digital medium environment including an audio editing application that performs audio remixing on an audio recording, an improved audio remixing method implemented by the audio editing application, the method comprising: segmenting an original audio recording into a plurality of beats; computing, for individual ones of the plurality of beats, transition costs for transitioning from a beat to different beats of the plurality of beats; and repeating, until a remixed audio recording reaches a target duration: using the computed transition costs to identify a transition having a lowest transition cost, the transition being a path between a first beat and a second beat of the plurality of beats; inserting the identified transition into the remixed audio recording; and updating a transition cost associated with the inserted transition.

In one or more implementations, in a digital medium environment in which a computing device can use an audio editing application to produce a remixed audio recording, one or more computer-readable storage media store instructions that implement the audio editing application which, in response to execution by the computing device, perform audio editing operations comprising: sorting a plurality of transitions between beats of the original audio recording based on transition costs associated with individual ones of the plurality of transitions; inserting a transition from the original audio recording into the remixed audio recording, the inserted transition being a path between a first beat and a second beat in the original audio recording; and updating a transition cost associated with the inserted transition by assigning a penalty duplication cost to the transition cost associated with the inserted transition to reduce duplication of the inserted transition in the remixed audio recording.

In one or more implementations, a system includes a computing device having an audio editing application to enable audio remixing, the system comprising: a processing system; one or more computer readable media storing instructions that are executable via the processing system to implement an audio editing application configured to perform operations comprising: receiving a plurality of beats of an original audio recording; receiving, for individual ones of the plurality of beats, a transition cost for transitioning from a beat to different beats of the plurality of beats; and repeating, until a remixed audio recording reaches a target duration: using the transition costs to identify a transition having a lowest transition cost, the transition being a path between a first beat and a second beat of the plurality of beats; inserting the transition identified as having the lowest transition cost into the remixed audio recording; and updating a transition cost associated with the inserted transition by assigning a penalty duplication cost to the transition cost associated with the inserted transition to reduce duplication of the inserted transition in the remixed audio recording.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
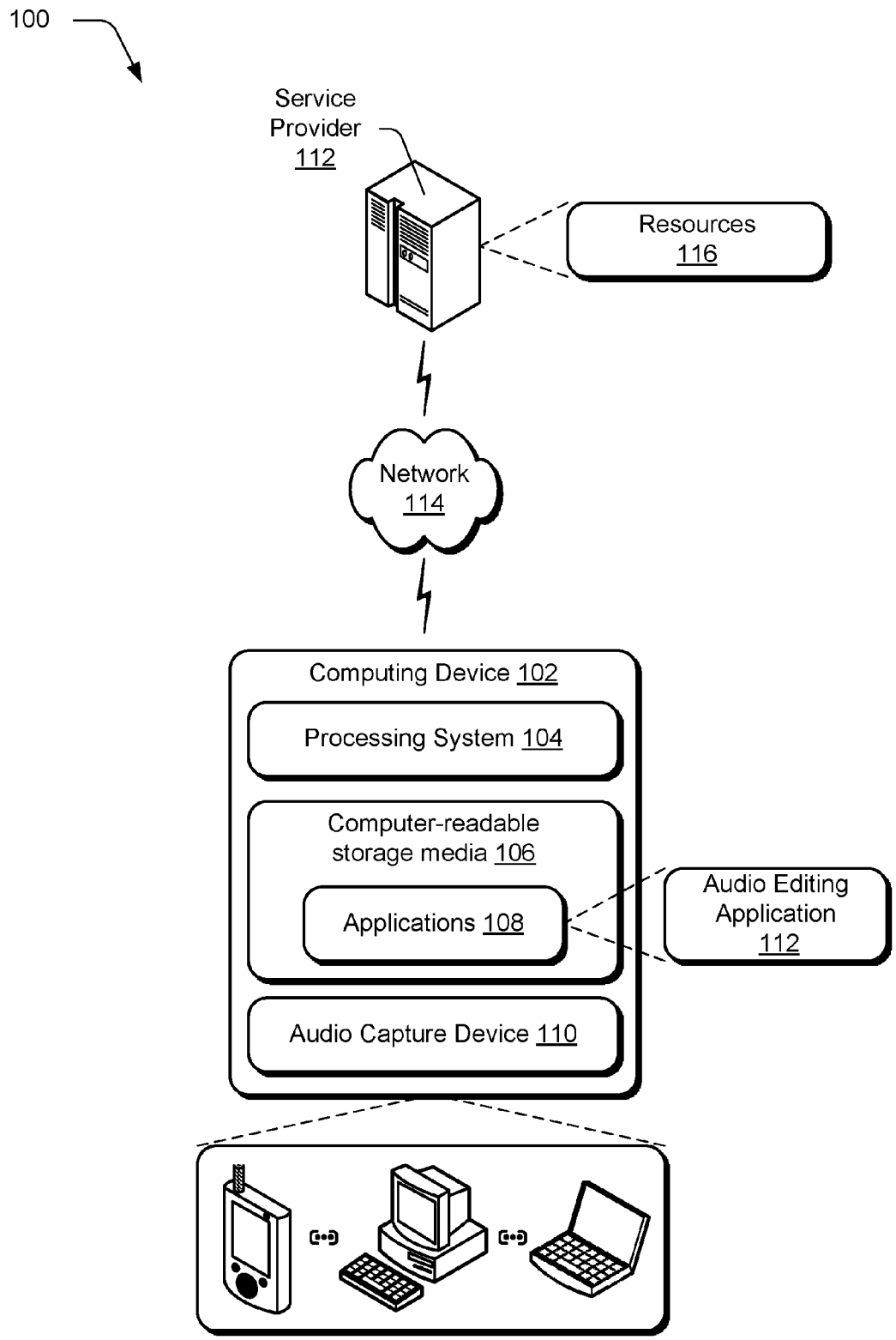
FIG. 1 is an illustration of a digital medium environment in an example implementation that is operable to employ techniques described herein.

In the description below, audio editing techniques are described in the context of remixing an original audio recording to extend the recording's playback duration while maintaining a quality and acoustic properties of the original audio recording. It is to be appreciated and understood, however, that the audio editing techniques can be utilized to decrease a playback duration of an audio recording, without departing from the spirit and scope of the claimed subject matter.

Remixing audio often requires performing a number of onerous tasks. A user remixing audio to fit a target duration must perform difficult tasks including segmenting an original audio recording in a uniform manner, identifying segments suitable for insertion into a remixed audio recording, and identifying suitable locations for their insertion while maintaining the original audio recording's overall quality. Thus, users who wish to remix audio are often faced with a large and daunting task. Previous approaches to remixing audio to fit a target duration include stretching or compressing a playback duration of source audio to equal the target duration. However, this approach often results in remixed audio having an entirely different tempo than an original tempo of the source audio, which is undesirable. For example, stretching a song having an original duration of three minutes to fit a target duration of 30 minutes would result in a remixed song having a much slower tempo than its original version. Audio quality is generally determined based on the audio's timbre, which is a general term for audio characteristics that enable the human ear to distinguish between sounds that have the same pitch and loudness. Timbre is primarily determined by the harmonic content and dynamic characteristics of a sound. Accordingly, stretching or compressing an audio recording often ruins or degrades its quality.

An alternative approach to remixing audio to fit a target duration involves a trained audio engineer manually chopping an audio recording into small pieces and duplicating segments such as a refrain, course, bridge, and so on, to fit a target duration. However, because this approach is time-intensive even for the most skilled audio engineers, it is often very expensive. Although automated approaches to remixing audio to fit a target duration avoid the cost of paying an audio engineer, these approaches often create repetitive loops of portions of the audio that become highly noticeable to a human listener. While it is possible to use a brute force approach to attempt to avoid repetitions, the runtime complexity is extremely high, thus automated brute force approaches are unfeasible in practice. Furthermore, there is no guarantee that the repetitive loops feature much of an audio recording's original material in a form intended by its creator. Thus, automated approaches frequently sacrifice much of an audio recording's quality, which is often undesirable.

Introduced herein are techniques that address the drawbacks of previous approaches, such as those mentioned above. The techniques utilize a novel cost-based audio remixing method in which an original audio recording is segmented to produce beat segments. The beat segments are then compared with each other to determine how natural a transition from one beat to another would sound during playback and to produce a transition cost associated with this transition. The beat segments and associated transition costs are then used to create a remixed audio recording that plays back over a target duration, avoids repetition, and sounds natural to a human listener.

The beat segmentation process aims to produce segments that span beat-length intervals of the original audio recording. Individual beats are identified as corresponding to the onset of a pitched sound, such as a note played by an instrument in a song. The beat segmentation process also aims to separate beat segments by a locally constant inter-beat interval to provide a regular spacing between beat segments. In this way, a remixed audio recording produced from the beat segments will maintain a beat-level structure of the original audio recording. The beat segments are then analyzed to determine how individual beat segments are related to each other.

The beat segment comparison process aims to identify how acoustic properties of individual beat segments are related to one another. Beat segments are compared against one another to identify similar acoustic features such as harmonic and timbre similarities between beat segments. Differences between these acoustic properties are then quantified as transition costs to rank transitions between beat segments based on how natural a transition would sound to a human listener during playback. The transition costs are then used with the beat segments to produce a cost-based remixed audio recording.

The cost-based remixing process aims to produce a remixed version of an original audio recording that plays back over a target duration of time. The remixed audio recording is built by selecting a beat segment and identifying transitions from that beat segment to different beat segments that will be audibly pleasing to a human listener during playback. Beat segments are selected for use based on their associated transition costs until the remixed audio recording includes enough beats to span the target duration. By selecting beat transitions with the lowest associated transition cost, a remixed original recording will preserve distinctive qualities of the original and sound natural to a human listener.

In order to reduce the repetition of beat transitions in the remixed audio recording, transition costs are updated as the remixed audio recording is produced. Transition costs are updated by assigning penalties to transitions between beats after the transitions are inserted into the remixed audio recording. The assigned penalties are referred to herein as "penalty duplication costs" and quantify how repetition affects a human listener's perception of audio quality. By assigning a penalty duplication cost to a transition after the transition has been used, the techniques described herein produce a remixed audio recording that accounts for human perception of audio repetition.

Penalty duplication costs may also be assigned to transitions that are similar to an inserted transition. Assigning penalty duplication costs to similar transitions reduces repetition of transitions that are not identical to an inserted transition, but would sound similar to a human listener. Transition costs associated with beat transitions are updated as the transitions are inserted until the remixed audio recording reaches a target length. The remixed audio recording is then output for playback.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include an audio editing application 112. The audio editing application 112 is configured to apply audio remixing techniques, as described below in more detail.

Applications 108 may also include a web browser which is operable to access various kinds of web-based resources (e.g., content and services). The applications 108 may also represent a client-side component having integrated functionality operable to access web-based resources (e.g., a network-enabled application), browse the Internet, interact with online providers, and so forth. Applications 108 may further include an operating system for the computing device and other device applications.

The computing device 102 may also, but need not, include an audio capture device 110, such as a microphone, that can capture an original audio recording which may be automatically processed, as described below, by audio editing application 112.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 5.

The digital medium environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, an audio editing service (such as one that employs an audio editing application such as audio editing application 112), a web development and management service, a collaboration service, a social networking service, a messaging service, an advertisement service, and so forth. Content may include various combinations of assets, video comprising part of an asset, ads, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of an audio editing application in accordance with one or more implementations.

Example Audio Editing Application

Figure 2:
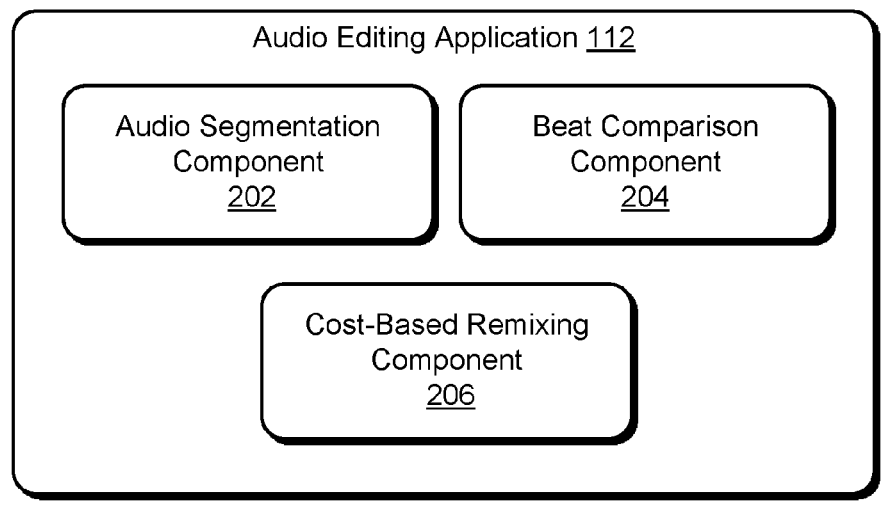
FIG. 2 illustrates an example audio editing application including an audio segmentation component, a beat comparison component, an audio retargeting component, and a cost-based remixing component in accordance with one or more implementations.
Figure 2:
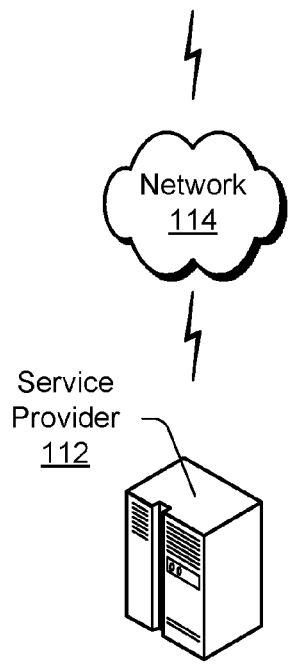

FIG. 2 illustrates a digital medium environment 200 that includes an example audio editing application 112. In this implementation, the audio editing application 112 includes an audio segmentation component 202, a beat comparison component 204, and a cost-based remixing component 206.

Audio segmentation component 202 is representative of functionality that processes an original audio recording to identify an overall beat sequence in the audio recording. By segmenting an audio recording into individual beats, a remixed audio recording constructed from the segmented beats will play back at a tempo generally the same as an original tempo of the audio recording. As discussed herein, a tempo that is generally the same as an original tempo of the audio recording includes a tempo that is the same as the original tempo. A tempo that is generally the same as an original tempo of the audio recording also includes a tempo that is slightly different than the original tempo. Thus, the audio segmentation component 202 aims to ensure that a remixed audio recording shares a common beat-level structure with an original audio recording. In one or more implementations, the audio segmentation component 202 receives an original audio recording and processes the original audio recording to identify individual beats based on acoustic properties of the original audio recording. This provides segments of an original audio recording that can be automatically remixed without substantially altering a tempo of the original audio recording.

Beat comparison component 204 is representative of functionality that processes beats of an original audio recording to identify how individual beats are related to one another. A relationship between two beats is defined in terms of the beats' acoustic properties such as harmonic similarity between beats and timbre similarity between beats. This relationship generally indicates whether a transition between two beats would sound natural. Accordingly, beat comparison component 204 is configured to receive information describing the segmented beats from audio segmentation component 202 and analyze how the segmented beats are related to one another. Beat comparison component 204 then assigns cost values to beat transitions based on its analysis. The assigned cost values indicate how natural a transition between two beats would sound to a human listener during playback. For example, transitioning between consecutive beats of a piano solo would sound natural. In contrast, transitioning from a beat in a piano solo to a beat in a guitar solo would sound very unnatural. Natural-sounding transitions are assigned lower cost values than unnatural-sounding transitions. These cost values are used by the audio editing application to identify the most natural sounding transitions for use in a remixed audio recording.

Cost-based remixing component 206 is representative of functionality that uses transition cost values to remix an original audio recording. The transition cost values are used to extend a playback duration of an original audio recording while maintaining acoustic properties of the original recording. In accordance with one or more implementations, the cost-based remixing component 206 receives a target duration for a remixed audio recording. The target duration can be received from any suitable source such as an application, user, and the like. The remixed audio recording is then produced by combining segmented beats from the original audio recording to fill the target duration in a manner that has the lowest associated transition cost values.

However, as is discussed in further detail below, in situations where a target duration is longer than an original duration of the original audio recording, repetition becomes a problem. Remixing audio to fit a longer target duration often results in repeating a beat transition associated with a lowest transition cost. For example, a beat transition associated with a lowest transition cost would be repeated as many times as needed until the remixed audio recording reaches the target duration. Repeating the same beat transition produces repetitive segments of an original audio recording in a remixed audio recording. Because human perception is keen on repetition and regards repetition in audio as low quality, this approach produces low quality remixed audio recordings.

Accordingly, the cost-based remixing component 206 selects beat transitions for use in a remixed audio recording based on transition cost values computed by beat comparison component 204 and dynamically updates these transition cost values during remixing. As discussed in further detail below, these transition cost values are dynamically updated based on beat transitions that are selected for use in a remixed audio recording. In this manner, an original audio recording can be automatically remixed to play back over a target duration without excessive repetitions to produce high quality audio recordings that sound natural to a human listener.

Having considered an example audio editing application and its components, consider now an audio segmentation component, a beat comparison component, and a cost-based remixing component in more detail in accordance with one or more embodiments.

Audio Segmentation Component

In accordance with one or more implementations, audio segmentation component 202 receives and processes an original audio recording to produce segments that span individual beats of the original audio recording. In order to identify when a beat occurs in the original audio recording, audio segmentation component 202 processes the original audio recording to derive a sequence of approximate beat instances. These approximate beat instances correspond to when a human might tap his foot if he were listening to the original audio recording. This processing can be performed by satisfying two constraints. The first constraint is that individual beats in an audio recording should generally correspond to the onset of a pitched sound, such as a note played by an instrument in the audio recording. The second constraint is that individual beats should be separated by a locally constant inter-beat interval that describes a regular spacing between individual beats in the original audio recording. Because musical rhythm of an audio recording is defined by temporal spacing between its beats, segmenting an audio recording into individual beats maximizes the probability that rearranging individual segmented beats will maintain a consistent rhythm with the original audio recording.

When an original audio recording is received, audio segmentation component 202 processes the original audio recording to identify individual beats. As outlined by the two constraints discussed above, the goal of this processing is to generate a sequence of beat times for the original audio recording as corresponding to perceived onsets in the recording that constitute a regular, rhythmic pattern in themselves. Any suitable approach can be used to segment an original audio recording into individual beats. In accordance with one or more implementations, audio segmentation component 202 uses dynamic programming to achieve this goal. An example of using dynamic programming to perform beat segmentation is described in more detail in Ellis, D., Poliner, G.: *Identifying 'cover songs' with chroma features and dynamic programming beat tracking*. ICASSP (2007) 1429-1432.

Once the audio segmentation component 202 processes an original audio recording into beat segments, the beat segments can be rearranged to create a remixed audio recording. Because the remixed audio recording is constructed from beat segments of the original audio recording, the remixed audio recording will have a tempo similar to that of the original audio recording. However, there is no guarantee that any two of these beat segments will sound natural if the two beat segments are played back-to-back.

For example, consider an example scenario where an original audio recording is a song clip. Audio segmentation component 202 may process the song clip and identify that the song clip includes 50 beats. In this example, beat $m_1$ corresponds to an initial beat in the song clip and beat $m_{50}$ corresponds to a final beat in the song clip. In this example, the original progression of the song clip would progress incrementally by beat from beat $m_1$ to beat $m_{50}$, therefore it is assumed that contiguous beat transitions (i.e., transitions from beat $m_1$ to beat $m_2$, from beat $m_5$ to beat $m_6$, from beat $m_{49}$ to beat $m_{50}$, etc.) will sound natural to a human listener during playback. However, there is no guarantee that non-contiguous beat transitions (i.e., transitions from beat $m_1$ to beat $m_9$; from beat $m_2$ to beat $m_4$, etc.) will sound natural to a human listener during playback. Furthermore, beat order of the original audio recording is an important consideration in determining whether a transition between beats would sound natural. For example, a transition from beat $m_i$ to beat $m_{i+1}$ will sound natural to a human listener because the transition respects an original progression of the song clip. In contrast, playing back a transition from beat $m_i$ to beat $m_{i-1}$ does not respect the original progression of the song clip, even though the beats are contiguous, and thus the transition is not guaranteed to sound natural. Accordingly, remixing beat segments without considering how individual beat segments are related to one another can lead to audibly displeasing remixed audio recordings.

Having considered an audio segmentation component, consider now an example beat comparison component in accordance with one or more embodiments.

Beat Comparison Component

In accordance with one or more implementations, beat comparison component 204 receives beat segments of an original audio recording and estimates whether transitioning from one beat segment to different beat segments of the audio recording would sound natural. Beat segments may be received from any suitable source, such as audio segmentation component 202, applications 108, from a remote source via network 114, and so on. Beat comparison component 204 is configured to perform this estimation for each beat segment in the original audio recording. To do so, beat comparison component 204 analyzes acoustic features, such as timbre and harmonic features, of individual beat segments and compares acoustic similarities involved in transitioning from one beat segment to another. These acoustic similarities involved with transitioning between two beat segments are quantified as a "transition cost", which indicates whether a transition between two beat segments would sound natural. Although acoustic features are discussed herein in terms of timbre and harmonics, these example features are not intended to limit and should not be construed as limiting the acoustic features considered by beat comparison component 204. For example, additional acoustic features may include pitch features, spectrum features, and loudness envelope features. Accordingly, other acoustic features can be utilized without departing from the spirit and scope of the claimed subject matter.

To quantify these timbre and harmonic similarities involved with transitioning between beat segments, beat comparison component 204 computes a transition cost matrix T for transitioning among beat segments of an original audio recording. For example, an original audio recording may include an initial beat segment $m_a$, a final beat segment $m_b$, and beat segments $m_i$ to $m_j$, where $a \leq i < j \leq b$. A transition in the original audio recording from beat segment $m_i$ to beat segment $m_{i+1}$ sounds natural because the transition represents the original progression of the original audio recording. Accordingly, beat comparison component 204 computes a transition cost matrix T to produce transition cost values for transitioning among beat segments $m_a$ to $m_b$. For simplicity, assume that a=i, b=j, and j≠i+1. Given these assumptions, beat comparison component computes transition cost matrix T such that:

$$T_{i,j} = \frac{D_h(m_{i+1}, m_j)}{\sigma_h} + \frac{D_t(m_{i+1}, m_j)}{\sigma_t} \quad \text{(Eq. 1)}$$

In Equation 1, $D_h(m_{i+1}, m_j)$ represents the Euclidean distance between chroma features of beat segments $m_i$ and $m_j$. As will be appreciated by the skilled artisan, chroma features are a measure of harmonics. Chroma features are known and are described in more detail in Ellis, D., Poliner, G.: *Identifying 'cover songs' with chroma features and dynamic programming beat tracking*. ICASSP (2007) 1429-1432. Returning to Equation 1, $D_t(m_{i+1}, m_j)$ represents the distance between the mel-frequency cepstral coefficients (MFCCs) of beat segments $m_i$ and $m_j$. As will be appreciated by the skilled artisan, MFCCs represent audio spectral characteristics and can be used as a measure of timbre. MFCCs are known and are described in more detail in: Logan, B. *Mel frequency cepstral coefficients for music modeling*. ISMIR (2000). Returning once more to Equation 1, $\sigma_h$ represents the standard deviation across harmonic distances among all beat segments in the original audio recording. Similarly, $\sigma_t$ represents the standard deviation across timbre distances among all beat segments in the original audio recording.

Computing Equation 1 as described above produces transition cost matrix T, with matrix entries representing a cost for transitioning between beat segments $m_i$ and $m_j$. As evidenced by Equation 1, the harmonic distance $D_h(m_{i+1}, m_j)$ and timbre distance $D_t(m_{i+1}, m_j)$ will equal zero for transitions between sequentially contiguous beats $m_i$ and $m_j$ (i.e., where j=i+1). Accordingly, the cost for transitioning from beat segment $m_i$ to beat segment $m_j$ during playback when j=i+1, which reflects an original progression of the original audio recording, is zero. This transition from beat segment $m_i$ to beat segment $m_j$, when j=i+1, is defined as or considered a trivial transition. In contrast, a non-trivial transition is defined as a transition between two beat segments that are not sequentially contiguous in the original audio recording. Non-trivial transitions and transitions between beat segments having greater harmonic distances and timbre distances will produce higher cost entries in matrix T. Thus, a low transition cost suggests a natural sounding transition between beat segments and a higher transition cost suggests a less natural sounding transition.

Transitions between two beat segments of an original audio recording are used to identify sections of the original audio recording that can be played back multiple times to extend a duration of the original audio recording. For example, a user wanting to extend an original audio recording from an original duration of three minutes to a target duration of three minutes and thirty seconds would need to identify one or more sections of the original audio recording that can be repeated to add thirty seconds to the original duration. In this example, the user may identify that there are 30 seconds between a $4^{th}$ beat and a $19^{th}$ beat of an original audio recording and that a transition from the $19^{th}$ beat to the $4^{th}$ beat sounds natural during playback. The user would then insert this beat transition into the original audio recording to produce a remixed audio recording that plays back over the target duration of three minutes and thirty seconds. In this example, the remixed audio recording would play back following a natural progression of the original audio recording from an initial beat to the $19^{th}$ beat, loop back to the $4^{th}$ beat, and play back following the natural progression until a final beat of the original audio recording.

As will be appreciated by the skilled artisan, longer loops of an original audio recording are often less noticeable to a human listener, and therefore the beat comparison component 204 is configured to look for transitions between beat segments $m_i$ and $m_j$ that maximizes j−i, subject to other constraints discussed herein.

In order to accomplish this, beat comparison component 204 tunes a cost threshold θ to trade off between finding more loops with a higher average transition cost (high θ) or fewer loops with lower average cost (low θ). In accordance with one or more implementations, setting θ with respect to mean and standard deviations of harmonic distances and timbre distances among beat segments of an original audio recording provides a good balance for tuning the transition cost matrix T such that $T_{i,j} < \theta$.

After the beat comparison component 204 computes the transition cost matrix T as described above, beat segments of an original audio recording can be remixed to create a remixed audio recording that will both sound natural and have a tempo and rhythm similar to that of the original audio recording. This can be accomplished in accordance with the following equation:

$$\theta = \frac{\mu_h - \sigma_h}{\sigma_h} + \frac{\mu_t - \sigma_t}{\sigma_t} \quad \text{(Eq. 2)}$$

In Equation 2, $\mu_h$ represents the mean deviation across harmonic distances among all beat segments in the original audio recording. $\mu_t$ represents the mean deviation across timbre distances among all beat segments in the original audio recording. $\sigma_h$ represents the standard deviation across harmonic distances among all beat segments in the original audio recording. Similarly, $\sigma_t$ represents the standard deviation across timbre distances among all beat segments in the original audio recording.

Having considered a beat comparison component, consider now an example cost-based remixing component in accordance with one or more embodiments.

Cost-Based Remixing Component

In accordance with one or more implementations, cost-based remixing component 206 uses beat segments of an original audio recording in combination with transition costs associated with the beat segments to produce a remixed audio recording. The remixed audio recording may be an extended version of the original recording configured to play back over a target duration of time that is longer than an original playback duration of the original audio recording. To do so, cost-based remixing component 206 identifies a cost-minimal path for remixing the original audio recording using the transition costs calculated by the beat comparison component 204. This cost-minimal path is dynamically updated as the cost-based remixing component 206 remixes the original audio recording to reflect actions performed by the cost-based remixing component 206. In this manner, cost-based remixing component 206 produces a high-quality remixed audio recording that avoids inclusion of repetitive segments.

In order to extend an original audio recording from its original duration, cost-based remixing component 206 determines a target duration for a remixed audio recording. This target duration may be any length of time and may be configured for any suitable purpose, such as to span the duration of a video clip. Alternatively, the target duration may be set to infinity in accordance with one or more implementations. The target duration defines a target number of beat segments to be included in the remixed audio recording. Because the original audio recording was segmented into beat segments, the number of beat segments to include in the remixed audio recording can be determined by dividing the target duration by an average duration of all beat segments in the original audio recording. For purposes of the equations discussed below, this number of beat segments to be used in the remixed audio recording is discussed as 'M' beat segments.

Although it is computationally inexpensive to extend an audio recording from its original duration to play back over a target duration by simply playing the audio recording on repeat until the target duration is reached, this approach often produces audibly displeasing results. For example, repeating a song having an original playback duration of 3 minutes may abruptly cut off the song in the middle of a note onset if the song were extended to play back at a target duration of 3 minutes and 30 seconds. Accordingly, cost-based remixing component 206 uses structure-based music editing to remix an original audio recording from its original duration to a longer target duration. Structure-based music editing maintains a beginning portion and an ending portion of an original audio recording when the original audio recording is remixed to produce a remixed audio recording. Additionally, structure-based music editing uses beat transitions having the lowest associated transition costs for insertion in between the beginning and ending portions.

Structure-based music editing uses a dynamic programming-based solver to find a cost minimal path through a graph consisting of N nodes, where each of the nodes represents a beat segment of an original audio recording. The transition cost associated with each edge in the graph is based on the musical similarity of beat transitions as discussed above with respect to the transition cost matrix T. Additionally, a transition cost is also based on a number of static constraints. For example, a static constraint may specify that a minimum number of trivial transitions must be used before a non-trivial transition is selected for insertion into the remixed audio recording. This ensures that a minimum number of consecutive beat transitions from an original audio recording are preserved at any given point in a remixed audio recording and thereby preserves a natural progression of the original audio recording.

A cost c for transitioning across M beat segments beginning at beat segment $m_a$ and ending at beat segment $m_b$ can be defined as: $c(m_a, m_b, M)$. Recall that M beat segments are determined based on a target duration for a remixed audio recording. To compute $c(m_a, m_b, M)$, the cost-based remixing component 206 finds a beat $m_k$ that minimizes the cost of an M−1 beat sequence from $m_a$ to $m_k$ plus the cost of a one beat sequence from $m_k$ to $m_b$. Cost-based remixing component 206 accomplishes this by using dynamic programming to solve the following equation:

$$c(m_a, m_b, M) = \min\{c(m_a, m_k, M-1) + c(m_k, m_b, 1)\} \quad \text{(Eq. 3)}$$

In order to preserve beginning and ending portions of an original audio recording, cost-based remixing component 206 prohibits $m_k$ from being equivalent to $m_a$ or $m_b$. This ensures that an initial beat segment and a final beat segment of the original audio recording are played back only once in a remixed audio recording. Alternatively, in one or more implementations cost-based remixing component 206 prohibits $m_k$ from being equivalent to a range x of beat segments at the beginning of the original audio recording or a range y of beat segments at the end of the original audio recording. In this implementation, $m_k \notin m_{a+x}$ and $m_k \notin m_{b-y}$. Beat segment ranges x and y may be any number of beat segments and may be user-defined. Additionally or alternatively, in one or more implementations cost-based remixing component 206 prohibits $m_k$ from being equivalent to one or more ranges s of beat segments in the original audio recording that do not occur at the beginning or end of the recording. By defining beat ranges that may be included in selecting $m_k$, cost-based remixing component 206 is able to limit portions of an original audio recording that may be included or repeated in a remixed audio recording.

When the target duration for a remixed audio recording specifies M beat segments, and M is significantly larger than N (number of beat segments in the original audio recording), because of the static nature of the graph discussed above, there will be periodic sub-paths through the graph that will result in repetitive beat segments in the remixed audio recording. Because human perception is keen on repetition, cost-based remixing component 206 dynamically updates transition cost values associated with beat segment transitions during the remixing process. Dynamically updating transition cost values deters Equation 3 from repeatedly selecting a non-trivial beat transition to use for extending an original audio recording.

As will be appreciated by the skilled artisan, extending an original audio recording using static transition cost values computed by the beat comparison component 204 in combination with Equation 3 (i.e., remixing without dynamically updating the transition cost values) will produce a remixed audio recording including repeated beat transitions having the lowest associated transition cost. In order to minimize transition costs, these beat transitions having the lowest associated transition cost will be repeated as many times as necessary to fill a target duration. In order to avoid repetitive beat segments, cost-based remixing component 206 penalizes the use of non-trivial beat transitions by increasing the transition cost associated with the non-trivial transition after the non-trivial transition is inserted into the remixed audio recording. As discussed above, a transition between beat segments $m_i$ and $m_j$ is a trivial transition when j−i=1 and is a non-trivial transition when j−i≠1.

To penalize the repeated use of non-trivial transitions in remixed audio, cost-based remixing component 206 assigns a penalty duplication cost to a non-trivial transition after the non-trivial transition is used in a remixed audio recording. Cost-based remixing component 206 also assigns a penalty duplication cost to transitions that are similar to a non-trivial transition used in a remixed audio recording. For example, a transition between beat segments $m_{i+1}$ and $m_{j+1}$ may sound substantially similar to a transition between beat segments $m_i$ and $m_j$.

However, while a human listener will recognize a transition from beat segments $m_{i+1}$ to $m_{j+1}$ as sounding similar to a transition from beat segments $m_i$ to $m_j$, an automated remixing approach would not recognize any similarity between the two transitions. Failing to account for similarities between beat transitions causes cost-based remixing component 206 to introduce repetitive, albeit slightly different, beat transitions into a remixed audio recording. Repeating similar beat transitions are easily perceived by a human listener and degrade audio quality.

Accordingly, to account for similar-sounding beat transitions, cost-based remixing component 206 defines a transition between beat segments $m_i$ and $m_j$ as being similar to transitions between beat segments $m_I$ and $m_J$ when $|i−I|≤P$ and $|j−J|≤P$. In accordance with one or more implementations, P can be set to any suitable number of beat segments and may be defined by a user. For example, in accordance with one or more implementations P may be set to equal four beat segments. Cost-based remixing component 206 uses a Gaussian kernel for penalty duplication cost computation and assigns the highest penalty duplication cost to the non-trivial transition that was actually used (i.e., the transition between beats $m_i$ and $m_j$).

The cost-based remixing component 206 then assigns attenuated costs for similar non-trivial transitions between beat segments $m_I$ and $m_J$ where $0<|i−I|<P$ and where $0<|j−J|<P$. For example, the penalty duplication cost may be computed as $G(i−I)+G(j−J)$, where G is the Gaussian kernel. In one or more implementations, the Gaussian kernel may use a relatively high variance (e.g., 2.0) and a relatively low mean (e.g., 0). Thus, the highest penalty duplication cost is assigned when i=I and j=J and the penalty duplication cost is attenuated as $|i−I|$ increases and $|j−J|$ increases. Accordingly, cost-based remixing component 206 dynamically updates transition costs associated with non-trivial beat transitions used in remixing an original audio recording to avoid or reduce repetitions and produce a more audibly desirable remix.

Having considered a cost-based remixing component, consider now example procedures in accordance with one or more embodiments.

Example Procedures

Figure 3:
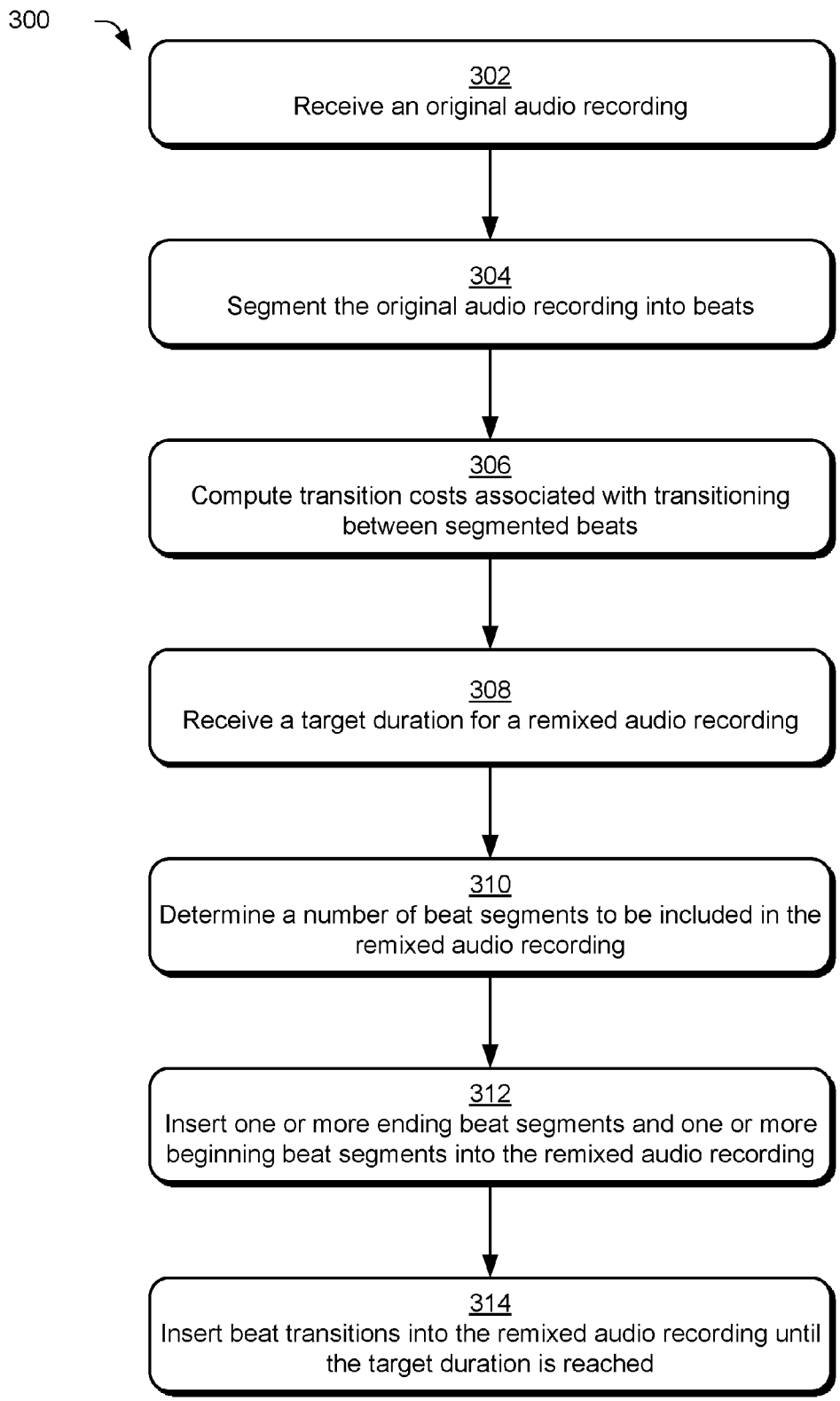
FIG. 3 is a flow diagram depicting an example procedure in accordance with one or more implementations.

FIG. 3 illustrates an example procedure 300 for performing audio editing in accordance with one or more embodiments described herein. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed in a digital medium environment by a suitably configured device, such as the example computing device 102 of FIG. 1 that makes use of an audio editing application 112, such as that described above.

An original audio recording that includes a plurality of beats to be remixed is received for segmentation processing (block 302). In accordance with one or more implementations, the original audio recording may be received from an audio capture device 110 of a computing device that makes use of an audio editing application 112, such as computing device 102 of FIG. 1. Alternatively, the original audio recording may be received from a remote source over a network, such as network 114 of FIG. 1. The original audio recording is processed and segmented into beats (block 304). One example of how this can be performed is described above. By using these beat segments, a remixed audio recording produced from the beat segments will maintain a common beat structure with the original audio recording.

The beat segments are then analyzed to compute transition costs associated with transitioning from a beat segment to different beat segments (block 306). This analysis is performed for each beat segment in the original audio recording. In various embodiments, transition costs can be computed by comparing harmonic similarities and timbre similarities between beat segments as described above. Computing transition costs as such quantifies how "natural" a transition between beat segments might sound to a human listener during playback. In computing transition costs, as described above, low transition costs are associated with natural-sounding transitions and high transition costs are associated with unnatural-sounding transitions.

The beat segments and associated transition costs can be used to produce a remixed audio recording that sounds very similar to the original audio recording. A target duration for the remixed audio recording is received (block 308). The target duration is used to determine a number of beat segments to be included in the remixed audio recording (block 310). For example, a number of beat segments to use in a remixed audio recording may be determined by dividing the target duration by an average beat duration, as described above. The target duration can be received from any suitable source such as an application, user, and the like.

After determining the number of beat segments to use in the remixed audio recording, one or more ending beat segments and one or more beginning beat segments are inserted into the remixed audio recording (block 312). In accordance with one or more implementations, a number of ending beat segments to use in the remixed audio recording may be specified by a user, as described above. Similarly, one or more beginning beat segments of the original audio recording may be specified for use in the remixed audio recording, as described above.

Once the beginning and ending beat segments are inserted into the remixed audio recording, procedure 300 inserts beat transitions into the remixed audio recording (block 314), as described above and as described in further detail below with respect to FIG. 4. These beat transitions are selected to connect the beginning beat segments to the ending beat segments, such that a playback duration of the connected beat segments equals the target duration.

Having considered an example procedure for remixing an original audio recording in accordance with one or more implementations, consider now an example procedure that can be utilized to perform cost-based audio editing in accordance with one or more implementations.

Figure 4:
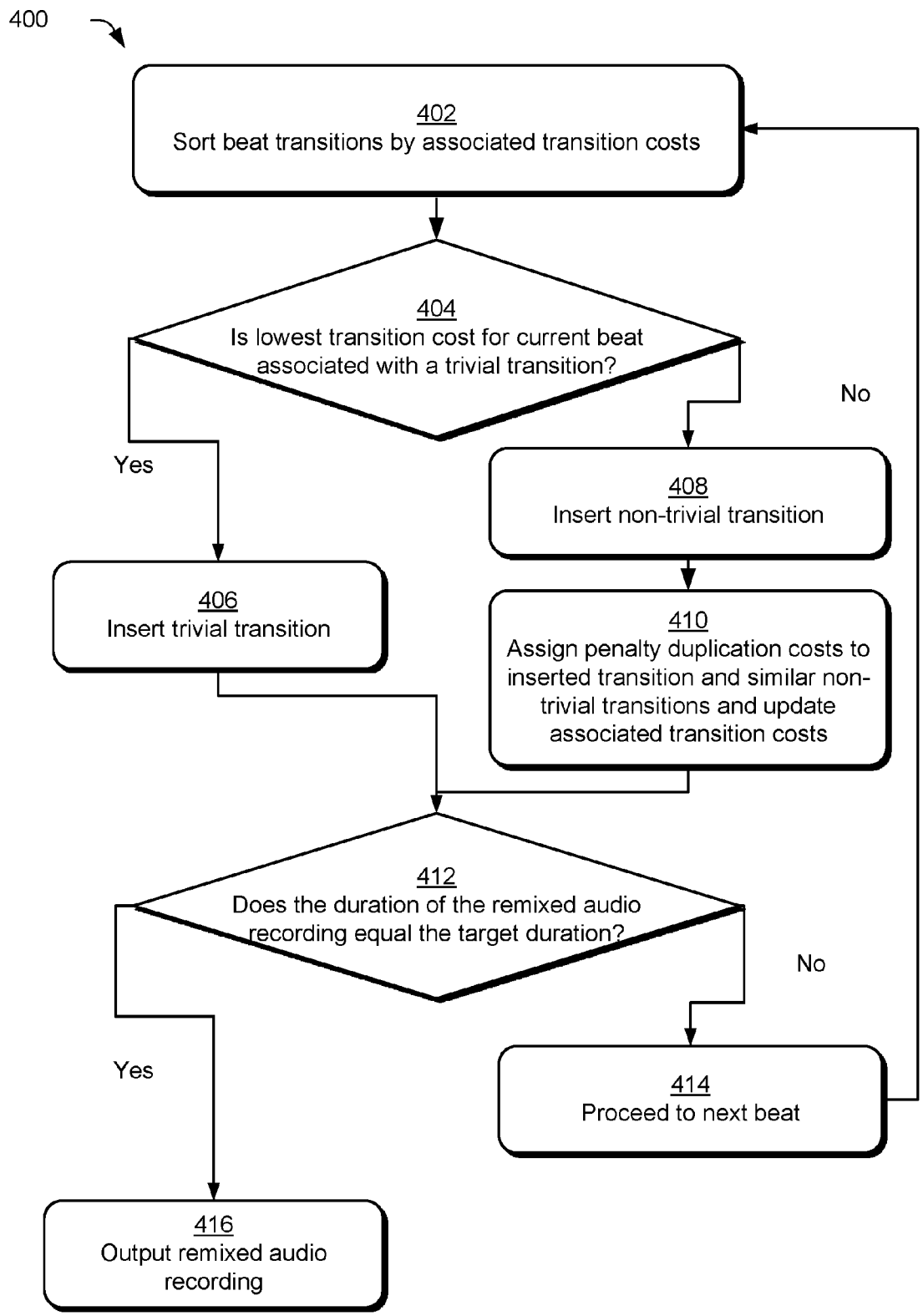
FIG. 4 is a flow diagram depicting an example procedure in accordance with one or more implementations.

FIG. 4 illustrates an example procedure 400 for performing audio editing in accordance with one or more embodiments described herein. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed in a digital medium environment by a suitably configured device, such as the example computing device 102 of FIG. 1 that makes use of an audio editing application 112, such as that described above.

As illustrated in FIG. 4, procedure 400 uses beat segments and associated transition costs to produce a remixed version of an original audio recording. An original audio recording may be segmented into beats as discussed above with respect to FIG. 3. Similarly, costs associated with transitioning between these segmented beats may be computed as discussed above with respect to FIG. 3.

Procedure 400 begins by sorting a plurality of transitions between beat segments of an original audio recording based on their associated transition costs (block 402). Once the beat transitions are sorted by cost, a cost-based remix of the original audio recording can be produced in accordance with one or more implementations. Beginning with one or more specified ending beat segments of a remixed audio recording, the sorted beat transitions are considered to determine if the lowest transition cost for transitioning from a beat segment $m_i$ to a current beat segment $m_j$ is associated with a trivial transition (block 404). As described above, a trivial transition refers to a transition between sequentially contiguous beat segments of the original audio recording such that the transition reflects a natural progression of the original audio recording during playback.

If it is determined that the lowest transition cost for transitioning to a current beat segment from a different beat is a trivial transition, the trivial transition associated with the lowest transition cost is inserted into the remixed audio recording (block 406). In this manner, an extended duration remixed audio recording is constructed by beginning with the one or more ending beat segments and adding one or more beat transitions as necessary to connect the one or more ending beat segments to the one or more initial beat segments.

Returning to the decision block 404, if the lowest transition cost for transitioning to a current beat from a different beat is associated with a non-trivial transition, the non-trivial transition is inserted into the remixed audio recording (block 408). In contrast to a trivial transition, a non-trivial transition refers to a transition between non-contiguous beats or between contiguous non-sequential beats of an original audio recording, as described above. In other words, a non-trivial transition refers to a transition between two beat segments that does not naturally occur during playback of the original audio recording.

After the non-trivial transition is inserted into the remixed audio recording, penalty duplication costs are assigned to the inserted transition and any non-trivial transitions that are similar to the inserted non-trivial transition (block 410). By only assigning penalty duplication costs to non-trivial transitions, computational cost associated with remixing the audio recording is significantly reduced. A transition cost associated with individual ones of the associated non-trivial transitions is then updated to include any assigned penalty duplication cost. An example of how this is done is provided above. In the example described above, a degree of similarity for non-trivial transitions may be specified by a user. This degree of similarity defines ranges of beat segments from beat segments involved in the inserted-non trivial transition. Transitions among beat segments within the defined ranges are considered to be similar because a human listener would recognize these transitions as virtually identical repetitions of the inserted transition. Penalty duplication costs are attenuated for the similar transitions based on this degree of similarity using a Gaussian kernel, as described above.

When the beat transition is inserted into the remixed audio recording, whether trivial or non-trivial, a duration of the remixed audio recording is compared against a target duration for the remixed audio recording (block 412). If the duration of the remixed audio recording is less than the target duration, the audio editing procedure 400 proceeds to a next beat segment (block 414). In accordance with one or more implementations, proceeding to the next beat segment includes inserting one or more trivial beat transitions after the beat transition that was previously inserted into the audio recording, as described above. This ensures that the remixed audio recording retains at least some of the natural progression of the original audio recording. A minimum number of trivial transitions (e.g., consecutive trivial transitions from an original audio recording) may be specified by a user in one or more implementations. This minimum number of trivial transitions are inserted into the remixed audio recording and the procedure returns to sort transitions between beat segments of the original audio recording by cost, which now include any assigned penalty duplication costs (block 402). This ensures that a minimum number of consecutive beat transitions from an original audio recording are preserved at any given point in a remixed audio recording and thereby preserves a natural progression of the original audio recording.

The procedure repeats these operations discussed above and depicted in blocks 402-412 until a duration of the remixed audio recording equals the target duration. Once the remixed audio recording reaches a target duration, the remixed audio recording is output (block 416). In accordance with one or more implementations, the remixed audio recording may be output to a speaker or an application 108 of a computing device that makes use of an audio editing application 112, such as computing device 102 of FIG. 1. Alternatively or additionally, the remixed audio recording may be output to one or more remote locations, such as service provider 112 via network 114 illustrated in FIG. 1.

Having considered example procedures in accordance with one or more implementations, consider now an example system and device that can be utilized to practice the inventive principles described herein.

Example System and Device

Figure 5:
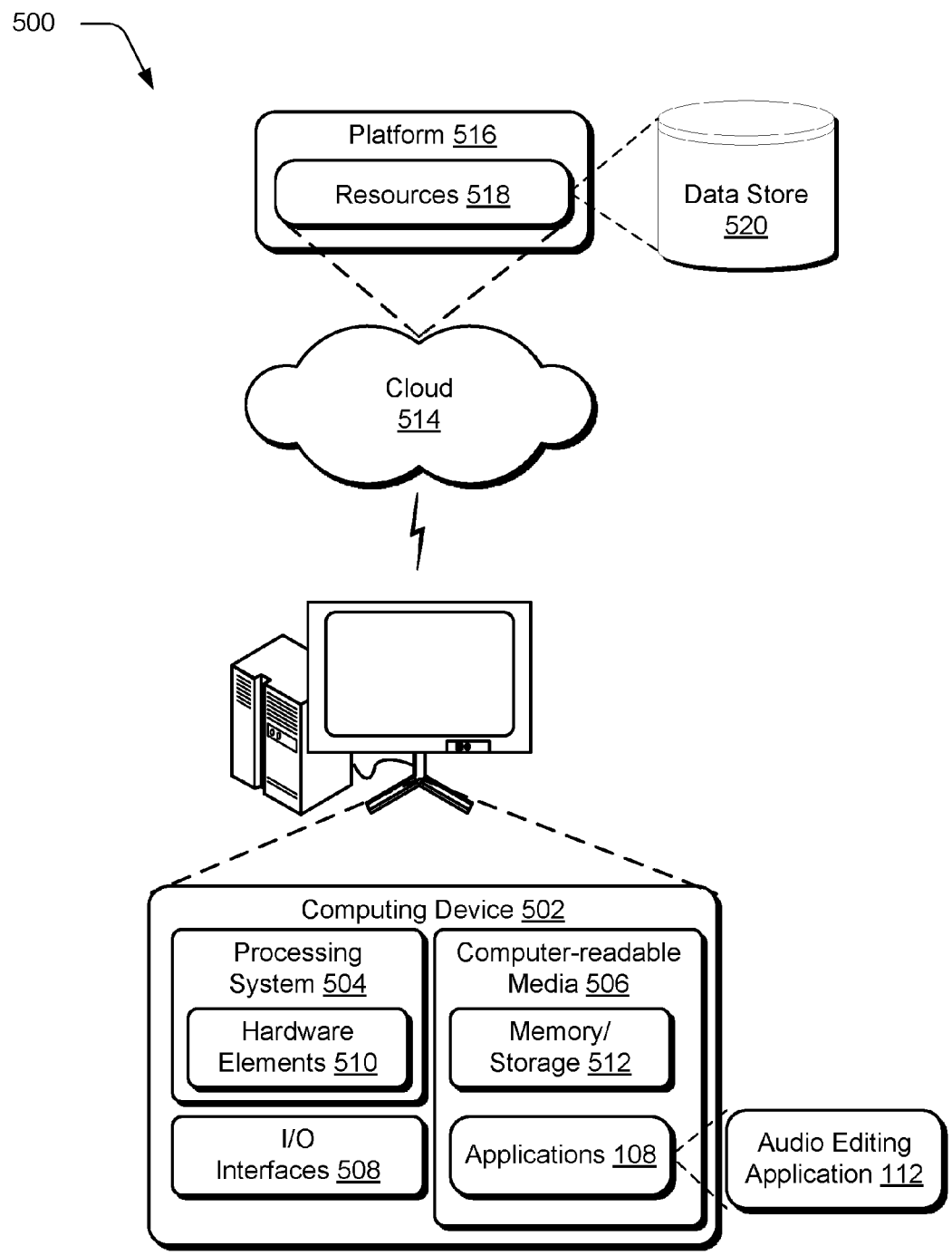
FIG. 5 illustrates an example system including various components of an example device that can be employed for one or more audio remixing implementations described herein.

FIG. 5 illustrates an example system generally at 500 that includes an example computing device 502 that is representative of one or more computing systems and/or devices that may implement the various techniques described herein. This is illustrated through inclusion of the applications 108 and, in particular, audio editing application 112, which operates as described above. The computing device 502 may be, for example, a server of a service provider, a device associated with a client (e.g., a client device), an on-chip system, and/or any other suitable computing device or computing system.

The example computing device 502 includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data of a data store 520 that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

CONCLUSION

In one or more implementations, a digital medium environment includes an audio editing application that performs automatic remixing on an original audio recording. An improved audio remixing method implemented by the audio editing application comprises receiving an original audio recording that includes a plurality of beats, segmenting the recording into individual beats, and computing transition costs associated with transitioning among the segmented beats to quantify how natural a transition would sound to a human listener. The method further comprises constructing a remixed audio recording based on the calculated transition costs and updating transition costs for beat transitions used in the remixed audio recording. The transition costs are updated by assigning penalty duplication costs to transitions as the transitions are inserted into the remixed audio recording, which reduces duplication of previously used transitions. Transitions are inserted, and transition costs updated, until the remixed audio recording reaches a target duration. Thus, the audio editing application provides a remix of the original audio recording that plays back over a target duration and is audibly pleasing to a human listener.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment that includes an audio editing application that performs audio remixing on an audio recording, an improved audio remixing method implemented by the audio editing application, the method comprising:
    segmenting an original audio recording into a plurality of beats;
    computing, for individual ones of the plurality of beats, transition costs for transitioning from a beat to different beats of the plurality of beats; and
    repeating, until a remixed audio recording reaches a target duration:
        using the computed transition costs to identify a transition having a lowest transition cost, the transition being a path between a first beat and a second beat of the plurality of beats;
        inserting the identified transition into the remixed audio recording; and
        updating a transition cost associated with the inserted transition.

2. A method as described in claim 1, wherein the original audio recording has an original duration that is less than the target duration.

3. A method as described in claim 1, wherein the original audio recording has an original duration that is greater than the target duration.

4. A method as described in claim 1, wherein a transition cost associated with the path between the first beat and the second beat is based on one or more of a measure of harmonic difference or a measure of timbre difference between the first beat and the second beat.

5. A method as described in claim 1, wherein a transition cost associated with the path between the first beat and the second beat is based on a temporal distance between the first beat and the second beat in the audio recording.

6. A method as described in claim 1, wherein updating the transition cost associated with the inserted transition comprises increasing the associated transition cost such that the updated transition cost is greater than a lowest transition cost.

7. A method as described in claim 1, wherein updating the transition cost associated with the inserted transition comprises assigning a penalty duplication cost to the inserted transition to reduce duplication of the inserted transition in the remixed audio recording.

8. A method as described in claim 1, wherein updating the transition cost associated with the inserted transition comprises assigning a penalty duplication cost to at least one beat transition that is similar to the inserted transition.

9. A method as described in claim 1, wherein the first beat and the second beat of the plurality of beats correspond to non-contiguous beats in the original audio recording.

10. A method as described in claim 1, further comprising inserting at least one trivial transition into the remixed audio recording when the inserted transition is a non-trivial transition.

11. A method as described in claim 1, wherein updating the transition cost associated with the inserted transition comprises maintaining the transition cost associated with the inserted transition if the inserted transition is a trivial transition.

12. A method as described in claim 1, wherein updating the transition cost associated with the inserted transition comprises assigning a penalty duplication cost to a similar transition, the similar transition being a path between a third beat and a fourth beat of the plurality of beats, the third beat being within a range of beats from the first beat and the fourth beat being within the range of beats from the second beat.

13. In a digital medium environment in which a computing device can use an audio editing application to produce a remixed audio recording, one or more computer-readable storage media storing instructions that implement the audio editing application which, responsive to execution by the computing device, perform improved audio editing operations comprising:
    sorting a plurality of transitions between beats of the original audio recording based on transition costs associated with individual ones of the plurality of transitions;
    inserting a transition from the original audio recording into the remixed audio recording, the inserted transition being a path between a first beat and a second beat in the original audio recording; and
    updating a transition cost associated with the inserted transition by assigning a penalty duplication cost to the transition cost associated with the inserted transition to reduce duplication of the inserted transition in the remixed audio recording.

14. One or more computer-readable storage media as described in claim 13, wherein the transition cost associated with a transition is based on one or more of a measure of harmonic difference between beats or a measure of timbre difference between beats.

15. One or more computer-readable storage media as described in claim 13, the operations further comprising inserting at least one trivial transition into the remixed audio recording in response to the inserted transition being a non-trivial transition.

16. A method as described in claim 13, wherein updating the transition cost associated with the inserted transition comprises assigning a penalty duplication cost to a similar transition, the similar transition being a path between a third beat and a fourth beat of the plurality of beats, the third beat being within a range of beats from the first beat and the fourth beat being within the range of beats from the second beat.

17. A system including a computing device having an audio editing application to enable audio remixing, the system comprising:
  a processing system;
  one or more computer readable media storing instructions executable via the processing system to implement an audio editing application configured to perform operations comprising:
    receiving a plurality of beats of an original audio recording;
    receiving, for individual ones of the plurality of beats, a transition cost for transitioning from a beat to different beats of the plurality of beats; and
    repeating, until a remixed audio recording reaches a target duration:
      using the transition costs to identify a transition having a lowest transition cost, the transition being a path between a first beat and a second beat of the plurality of beats;
      inserting the transition identified as having the lowest transition cost into the remixed audio recording; and
      updating a transition cost associated with the inserted transition by assigning a penalty duplication cost to the inserted transition to reduce duplication of the inserted transition in the remixed audio recording.

18. The system as described in claim 17, wherein a transition cost associated with the path between the first beat and the second beat is based on one or more of a measure of harmonic difference between the first beat and the second beat or a measure of timbre difference between the first beat and the second beat.

19. The system as described in claim 17, wherein updating the transition cost associated with the inserted transition comprises increasing the associated transition cost such that the updated transition cost is greater than the lowest transition cost.

20. The system as described in claim 17, wherein updating the transition cost associated with the inserted transition comprises maintaining the transition cost associated with the inserted transition if the inserted transition is a trivial transition.

* * * * *